Nov. 22, 1938.        E. J. McCARTHY        2,137,760
DIRECT CURRENT SIGNALING SYSTEM
Filed July 11, 1932        2 Sheets—Sheet 1
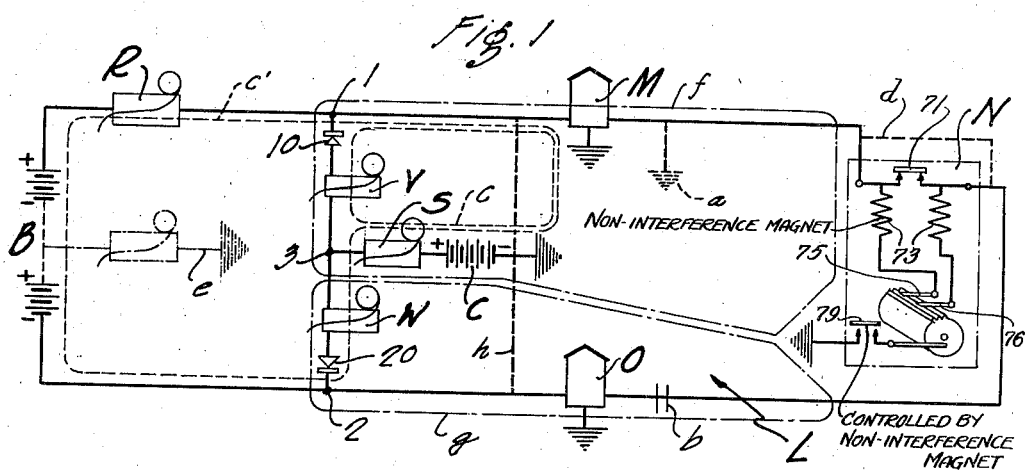
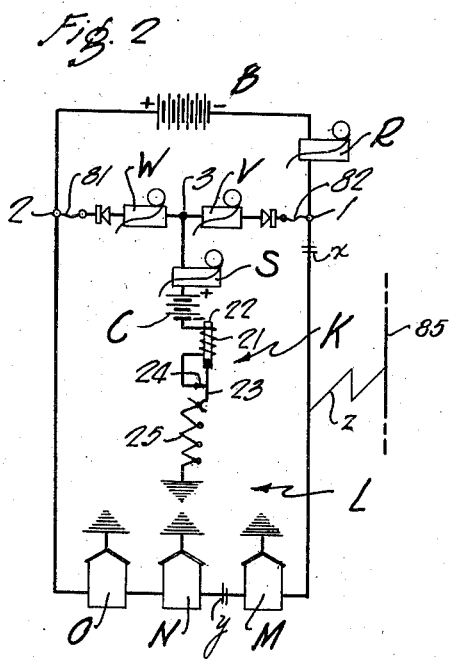
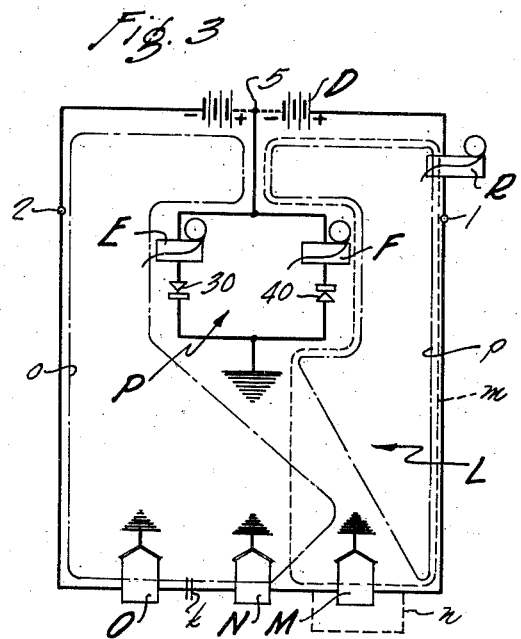
INVENTOR
EDWARD J McCARTHY
by Roberts, Cushman & Woodberry
ATT'YS Nov. 22, 1938.  E. J. McCARTHY  2,137,760
DIRECT CURRENT SIGNALING SYSTEM
Filed July 11, 1932  2 Sheets—Sheet 2
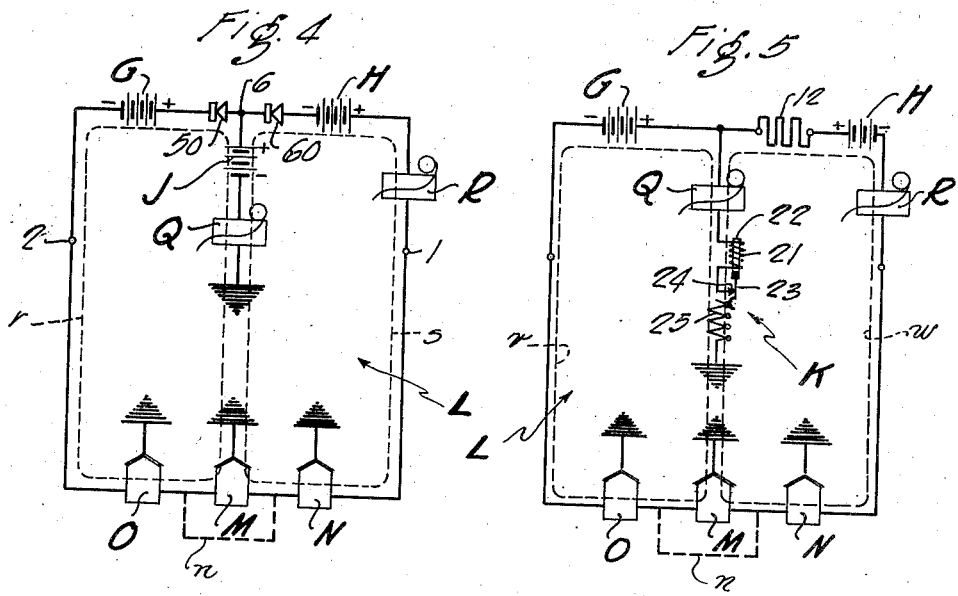
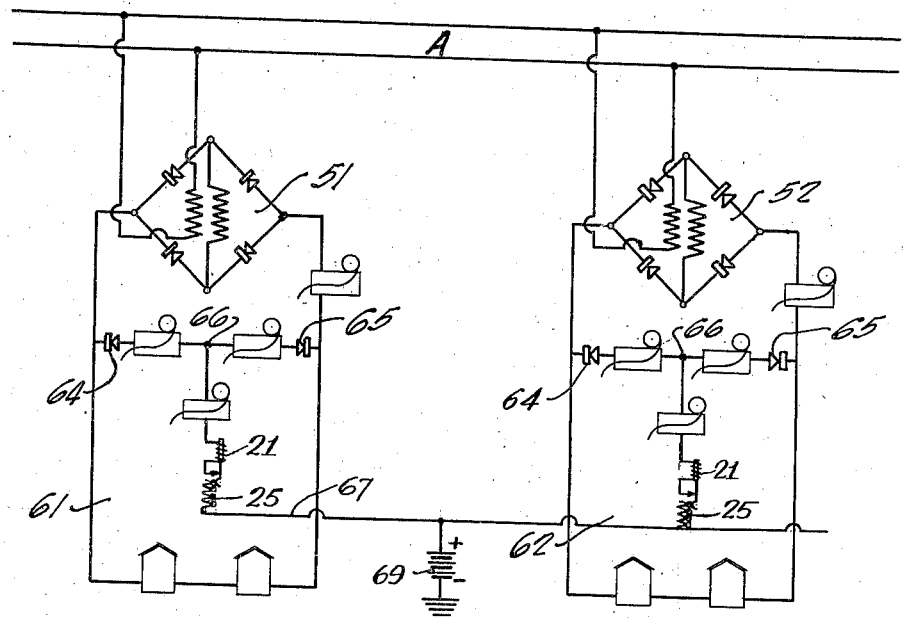
INVENTOR
EDWARD J McCARTHY
by Roberts, Cushman & Woodbury
ATTYS Patented Nov. 22, 1938

2,137,760

UNITED STATES PATENT OFFICE 2,137,760

DIRECT CURRENT SIGNALING SYSTEM

Edward J. McCarthy, Newton, Mass., assignor to The Gamewell Company, Newton Upper Falls, Mass., a corporation of Massachusetts Application July 11, 1932, Serial No. 621,785

6 Claims. (Cl. 177—367)

It has been proposed to provide signaling systems, on whose reliable operation depend preservation of life and property (as, for example, fire alarm systems), with instrumentalities which permit signal transmission even if the circuit of the system is disturbed as, for example, by a break, ground or short circuit of the signal transmission circuit, or by combinations of such faulty conditions. Such instrumentalities comprise usually arrangements employing the ground as an emergency conductor, which is associated with the circuit either by hand, upon recognition of a fault, or automatically by permanently connecting a point of the receiving station to the emergency conductor, the signaling devices being in both cases adapted to send signal impulses through the emergency conductor, either during every signaling period or only under certain emergency conditions. With direct current systems of this type, a mid-point of the supply source, usually a battery, is constantly connected to ground and a signal receiving device is contained in this ground connection. This arrangement has the disadvantage that under certain faulty line conditions, the receiver in the emergency conductor circuit does not respond due to the fact that currents caused to flow therein by the two halves of the battery respectively, substantially balance or cancel each other.

It is the main object of the present invention to provide a direct current signaling system permitting the reception, under most emergency conditions, of signals entering the receiving station through an emergency conductor.

In another aspect, the invention facilitates the making and maintaining of ground connections. With previously known systems, emergency grounds had to have excellent characteristics because of the fact that the E. M. F.'s at disposal for signaling over emergency circuits which offer in many cases a higher resistance than normal circuits, were weaker than the E. M. F.'s for normal operation. It is another object of the present invention to provide a signaling system which compensates (without incurring any waste of energy during normal operation) for high emergency signaling resistances, thereby eliminating the necessity of providing and maintaining costly ground connections.

In still another aspect, the invention permits the elimination of costly batteries. Heretofore, the main direct current source for each signaling circuit (no matter whether or not it was also used for emergency operation) had to be duplicated with a reserve source, usually a so-called floating battery, no matter whether the main source was a battery or a rectifier. With certain embodiments of my system the emergency signaling battery, common to all signaling circuits, can also be used as a reserve supply source, making the large number of floating batteries unnecessary. This emergency battery is available for emergency signaling in case of circuit disturbance, and also as a reserve source in case of failure of the main supply, and it is further constantly ready to indicate the presence of a ground of the outside loop. Further objects of my invention are therefore to provide a direct current signaling system which requires only one emergency and reserve battery in addition to any convenient normal supply source, for example rectifiers, nevertheless providing the degree of safety required by fire underwriters, and to provide such a system with an automatic ground supervising device which is constantly ready to indicate the presence of grounds of the signal loop.

Other objects and advantages of the new system will be apparent from the following description of several concrete embodiments thereof by way of example, which refers to drawings in which, Fig. 1 is the connection diagram of a fire alarm system according to the invention;

Fig. 2 is a diagram similar to Fig. 1 but incorporating a current regulator;

Fig. 3 is a diagram showing a modification of the system according to Fig. 1, with a rectifier couple;

Figs. 4 and 5 are diagrams of modifications employing unbalanced component circuits; and Fig. 6 is the diagram of an installation with one emergency current source and several signaling circuits similar to those of Fig. 1.

Generally speaking, the present invention employs a normally energized direct current signaling circuit with serially connected apparatus and an emergency signaling path adapted to connect any point of the outer circuit with the receiving station, and provides in the receiving station instrumentalities for separating or otherwise distinguishing the signal transmitting components of the emergency conductor current arriving through different branches of the outer signaling circuit.

Referring to Fig. 1, a representative embodiment of the invention will first be described. L is the outer circuit or signal loop leading to terminals 1 and 2 of the central station and comprises a number of signal transmitters represented by three signal initiating stations or alarm boxes M, N and O which may be of any type having provisions for sending signals over an emergency conductor such as the ground. Box N is schematically shown as of the type disclosed in the patent to Frederick W. Cole for "Successive non-interference signal box", No. 553,838, dated February 4, 1896, and will be described herein only as far as necessary for the explanation of the present invention. The mechanism of this alarm box comprises normally closed contacts 71 for shunting the box circuit at rest, contacts 75 and 76 for normal signaling, and a double non-interference magnet 73 which controls grounding switch 79, windings 73 being connected across switch 71. The intermediate terminals of windings 73 lead to contacts 75 and 76 respectively, the latter being arranged for interconnection therebetween and with the grounding switch 79 incident to the engagement therewith of the teeth of the code wheel 78. The normally open contact 79 is operable by the box mechanism to establish ground connection. Contacts 75 and 76 are for normal signaling when switch 79 is open. During emergency operation, that is, if the loop should remain open a longer time than the longest break within any signaling period, contacts 79 are closed and each connection between 75 and 76 is accomplished by a connection with ground over 79, whereas if 75 and 76 are disconnected the ground connection is also interrupted.

A main supply source, here a battery B, is connected to the terminals 1 and 2 in series with a signal responsive device R which may be a recorder, or a relay controlling a repeater circuit, or any other signal manifesting device. Across terminals 1 and 2 are connected in series two electric valves 10 and 20, and to a point 3 intermediate these valves are joined in series another signal responsive device S and a battery C whose second terminal is grounded. Two other recorders V, W, may be connected in series with the valves, on either side of the intermediate terminal 3. The electric valves which, for example, may be of the copper oxide type are so arranged that they conduct current substantially only in the direction indicated by the arrows of their symbols.

This system operates as follows: Under normal operating conditions signals are received at R, the signal impulses consisting of interruptions of the normally closed circuit including battery B, recorder R and loop L with its boxes, the interruptions being caused in well-known manner by the code wheels of the boxes.

An accidental ground indicated at $a$ of the line does not disturb the reception at R excepting certain special conditions to be discussed hereinafter, but recorder S indicates the faulty condition by attracting its armature, a circuit $a$ — ground — C—S—W—2—B—R—$a$ including battery C, recorder S and ground $a$ being now established in addition to normal circuit B—R—1—L—2—B.

In the case of an interrupted line, as indicated at $b$, two signaling circuits indicated with dotted lines $c$ and $c'$ (namely M—ground—C—S—V—1—M, and M—ground—C—S—3—W—20—2—B—R—1—M, respectively, are established by the ground connections of the signaling box, for example M, due to the de-energization of the non-interference magnet of the box. Under practical conditions, circuit $c$ carries only a negligible current as long as circuit $c'$ is closed.

Boxes on either side of the break are therefore enabled to transmit signals which are received at recorders S and R and, if additional recorders V and W are provided, also at recorder W, the circuits being separated by the rectifiers. The signaling circuit for boxes M and N, under such conditions, is: signaling box—ground—C—S—3—W—2—B—R—1— signaling box. Again, recorder V will not carry current under practical conditions. In case alarm box O is operated, the effective signaling circuit is O—ground—C—S—3—W—2—O, and signals are received at S and W whereas recorder R remains ineffective.

If a box, for example N, is shunted as indicated at $d$, no signals can be received at R since the circuit of R bridges box N and is therefore not affected by anything taking place at N. It is apparent that the grounding of a point of the central station through a recorder, for example of the mid-point of B, as indicated at $e$ with dot and dash lines, would be ineffective in a faulty situation of this type, since the currents flowing through the ground of the signaling box through both branches of the line back to the battery terminals would cancel each other. With the new circuit however, the two branches $f$ and $g$ (indicated with dot and dash lines as circuits N—ground—C—S—3—V—1—N, and N—ground—C—S—3—W—2—N, respectively), of the emergency circuit do not cancel each other but cooperate at S and act independently at V and W respectively. Under most practical conditions, effective current flows only in circuit $g$, so that signals sent from N over ground are received at S and W.

Similarly, if all boxes are shunted as indicated at $h$, any box is enabled to signal over ground, the signals being received at S.

During emergency signaling, currents are apt to vary considerably, depending upon the relative positions of fault and operating box. This is very undesirable since substantially uniform signaling currents are advantageous for a secure operation of the signal responsive devices. The present system lends itself well for maintaining uniform currents, as will now be explained by referring to Fig. 2.

The circuit of Fig. 2 is substantially similar to that of Fig. 1, but a ground current regulator K is added to the ground circuit. This regulator may be of any convenient design and is herein indicated by a magnet coil 21 attracting a core 22 to a higher or lesser degree, dependent upon the strength of the current flowing in its windings. The armature operates a contact 23, insulated therefrom, and slidingly associated with ground conductor contact 24 and resistor segments 25 so that more or less resistance elements are inserted, depending upon current variations. The current is in this manner maintained at a substantially constant value. It will be understood that this regulator will respond to signal impulses somewhat in the manner of signal-manifesting devices. In obvious manner provisions can be made, if desired, for decreasing resistance 25 only to a certain amount so that the regulator will not move its entire travel during each signal impulse.

In order better to explain the operation of this arrangement, certain resistance values for various portions of the circuit will be assumed. For example, the resistance of the outer loop, including the boxes, from terminal 1 to terminal 2, be 400 ohms, the resistance from 1 to B, 60 ohms, from B to 2 also 60 ohms, from 1 to 3, 30 ohms, from 3 to 2 also 30 ohms, and from 3 over recorder S, battery C and regulator K to ground 60 ohms. Accordingly, the main battery B must be dimensioned to overcome a resistance of 400+60+60=520 ohms, that is, it should be dimensioned for approximately 52 volts, in order to maintain a current of 0.1 amp. as conventional with systems of this kind. Assuming now that a break exists at $x$ very close to terminal 1, and that box M, very close to $x$, is pulled, the ground battery C has to overcome a resistance of 400+30+60=490 ohms, that is, the ground battery C would have to be dimensioned for approximately 49 volts in order properly to operate under these most unfavorable conditions. Assuming now that box M is pulled, and that M is situated intermediate 1 and break $y$, M and $y$ being very close to 1, the ground battery has then to overcome a resistance of only 30+60+120=210 ohms, which would cause an excessive current in the absence of the ground current regulator. However, with increasing current, the regulator inserts more resistance and adjusts the current to the desired value which may correspond to that prevailing under undisturbed line conditions. It will now be apparent that my new arrangement permits emergency signaling with practically constant signaling currents. Referring to the above example of signaling from an alarm box adjacent terminal 1, between 1 and a break $y$, it should be noted that under most practical conditions the described arrangement will carry an appreciable current only in circuit M—ground—C—S—W—2—B—R—M, whereas recorder V is not actuated by signals sent under such conditions.

Signaling circuits including, according to my invention, a current regulator in the emergency conductor have the further advantage of permitting signal reception in especially unfavorable situations where signals might be suppressed in spite of the separation of emergency signaling circuits. For example if in Fig. 1 (without current regulation) a ground should exist near terminal 1, a heavy current would flow in circuit ground—C—S—3—W—2—B—R—ground (circuit $c'$ of Fig. 1), whereas, under most practical conditions, no current will flow in circuit ground—C—S—3—V—1—ground (circuit $c$ of Fig. 1), so that reception, at any of the recorders, of signals caused by interruptions in the alarm boxes of circuit 1—L—2 would be impossible. However, if the current in the emergency circuit is retained at a comparatively low value, by current regulator K (Fig. 2), so that the current in $c'$ will be low as compared with that in the normal signaling path B—R—1—L—2—B, signals can be received at R from signal transmitters in 1—L—2. Under actually tested conditions, the current in R was for example 110 milliamperes, which dropped to 20 milliamperes to which the regulator was set, upon opening of the main circuit 1—L—2 by signaling from a box in the main loop which causes the current in R to drop to 20 milliamperes.

The use of a current regulator in the emergency circuit also permits signaling in case of failure of the main battery B or any break in circuit 2—B—R—1, with the aid of recorders V and W. Under such conditions, assuming again, for example, a break at $y$ and signaling from M, a circuit M—ground—K—C—S—3—V—1—M is established and signals received at V, the current being limited, if necessary, to permissible amounts by current regulator K. Similarly, a box N on the other side of the break would operate recorder W in circuit N—ground—K—C—S—3—W—2—N.

Instead of employing a separate ground battery and separating the emergency signaling currents with rectifiers intermediate main circuit and auxiliary ground battery, it is feasible to omit the separate battery and to distinguish the emergency circuits by means of rectifiers in the ground connection of a battery which serves as normal, and also as emergency current source. Such an arrangement is shown in Fig. 3. The line battery D supplies line L with boxes M, N and O, and has an intermediate terminal 5, preferably at a point substantially dividing its potential into half. Terminal 5 is connected to ground through a rectifier couple P comprising recorders E and F in series with electric valves 30, 40 respectively, E and 30 being in parallel with F and 40, and the valves being so connected that they pass currents in opposite directions.

Under normal conditions, for example, if the line with its boxes is not grounded, no current flows in the rectifier couple. Recorders E and F are inoperative, the signaling taking place as if the rectifier couple had not been provided for.

In the case of a break, as indicated at $k$ of Fig. 3, the non-interference magnet of box N causes the latter to signal through ground over circuit $m$, including recorders F and R. If box O at the other side is pulled, a similar circuit, including recorder E is established.

In the case of an accidental ground, operation takes place exactly as under normal conditions, since the main direct current is not interrupted. Two circuits similar to circuit $m$ are established and signals are received at E and F.

In the case of a short circuit around box M, indicated at $n$, the box M can not signal in the normal manner, since the main circuit is shunted around it. Its non-interference magnet, however, establishes ground connections through circuits $o$ and $p$ which transmit signals recorded at E and F. It is apparent that the currents of $o$ and $p$ flow in opposite directions between terminal 5 and the rectifier couple, and may be of equal value, so that they would cancel each other in a recorder connected between 5 and ground. According to the new arrangement however, the two currents are effectively separated by the rectifier couple.

Instead of separating the two emergency circuits by providing separate branch conductors therefor as shown in Figs. 1, 2 and 3, cancellation of the signaling current under certain emergency conditions may be prevented by unbalancing them. One possibility of doing this is illustrated in Fig. 4, where G and H are batteries with an intermediate terminal 6. Two rectifiers 50 and 60 are in series with the batteries, and a recorder R is again associated with the main signaling circuit. The second recorder Q and an auxiliary battery J in series therewith are connected intermediate terminal 6 and ground.

Upon operation through ground during emergency signaling, for example by short circuited box M, the currents in circuits $r$ and $s$ are of different strengths due to the unequal E. M. F.'s, namely the voltage of G minus that of J in the case of circuit $r$ and H plus J in the case of circuit $s$. Consequently, the currents can not cancel each other, and recorder Q responds to signal impulses arriving through ground.

There are other ways of unbalancing the currents in circuits having a common portion, and one such possibility is illustrated in Fig. 5. Here, instead of utilizing unbalanced E. M. F.'s of batteries, the resistances of the branch circuits are made unequal. The system of Fig. 5 has batteries G and H, a recorder R, a ground circuit recorder Q and a resistance 12. It is apparent that during emergency operation through ground, for example by shunted box M, circuits $v$ and $w$ carry unequal currents so that they can not cancel each other, one of them being able to operate relay Q.

Since the fault may be quite near to one station terminal so that the line resistances of the two branch circuits can become unequal, the resistances have to be dimensioned and located in such a manner that the branch currents are never equal at a point outside the central station if that point is grounded. In order to eliminate undesirably high currents, a current regulator K similar to that of Fig. 2 may be employed in the ground circuit, as shown in Fig. 5.

As already mentioned, my new system permits the elimination of emergency and/or reserve batteries. Heretofore, if the signal loops were supplied by sources other than batteries, a so-called floating battery had to be provided for each loop for operation and circuit supervision in the case of breakdown of the normal supply source. No emergency signaling is ordinarily possible with such systems. With my new system, a single battery in the common ground connection of the loops assures signal reception from any box of any loop during normal conditions if, for example, the normal supply source should fail, as well as under emergency conditions, if a loop is, for example, shorted or broken. As shown in Fig. 6, several loops 61, 62, may be supplied from a common alternating current supply A through rectifier bridges 51, 52. Employing for example, the embodiment according to Fig. 2, each signaling circuit has a pair of valves 64 and 65 and a midpoint terminal 66. These terminals are connected to a common conductor 67 which is grounded through an emergency battery 69. It is apparent that upon failure of the alternating current supply the non-interference magnets of the boxes initiate signaling over ground by means of battery 69, which is maintained charged by conventional means. Likewise, if any one loop becomes faulty, or even if all loops are disturbed, signaling is possible, no matter whether A is operative or not, by means of 69, as will now be apparent from the preceding description without further detailed explanation.

The capacity of battery 69 may be quite low since it is only needed during actual signaling under emergency conditions, either due to failure of the normal supply, or due to a fault of a signal loop. In an arrangement similar to that shown in Fig. 6, battery 69 also supervises the ground connections, since the armature elements of the recorders are attracted as soon as any point of the loops is grounded either accidentally, or purposely for testing the effectiveness of the emergency conductor, of which the ground connection of battery 69 is the most important part.

Systems of the type shown in Figs. 1 and 2 have the further advantage of protecting the central station against disturbances caused by contact with power lines. For example in Fig. 2, fuses are inserted in 81 and 82 in addition to the conventional fuses adjacent to B. Assuming now a crossing at $z$ with a power line 85, the current flows from 85 through $z$ to ground, blowing out fuse 81 and/or fuse 82, without affecting the main signaling circuit in any respect.

It will be evident that, although the arrangement shown is preferable, only one rectifier is necessary in the circuits according to Figs. 1, 2, 4 and 6, so that rectifiers 20, 60, 64 could be omitted.

It should be understood that the present disclosure is for the purpose of illustration only and that this invention includes all modifications and equivalents which fall within the scope of the appended claims.

I claim:

1. A signaling system comprising a signal loop, an emergency conductor for connection to points of said loop, signal transmitters in said loop for sending signals through said loop and through said conductor, a normal receiving station connected to the terminals of said loop and including a direct current source and a signal recorder, and an emergency receiving station connected between said conductor and a point of said normal station which point supplies to said emergency station a substantially uniform potential and including an emergency recorder and at least one unidirectional conductor for separating direct current carrying circuits including said conductor and different ones of said recorders.

2. A signaling system comprising a signal loop, an emergency conductor for connection to points of said loop, signal transmitters in said loop for sending signals through said loop and through said conductor, a direct current source and a signal recorder connected in series to the terminals of said loop, and an emergency signal recorder and a unidirectional conductor connected in series between said conductor and one of said terminals, for separating circuits including said conductor and different ones of said recorders.

3. A signaling system comprising a signal loop, an emergency conductor for connection to points of said loop, signal transmitters in said loop for sending signals through said loop and through said conductor, a direct current source and a signal recorder connected in series to the terminals of said loop, and an auxiliary direct current source, an emergency signal recorder and a unidirectional conductor connected in series between said conductor and one of said terminals, said unidirectional conductor being mounted for passing current in a circuit supplied by both sources in series and separating circuits including said conductor and different ones of said recorders.

4. A signaling system comprising a signal loop, an emergency conductor for connection to points of said loop, signal transmitters in said loop for sending signal impulses through said loop and through said conductor, a direct current source and a signal receiver connected in series to the terminals of said loop, two rectifier elements conducting current in different directions, respectively, and two emergency recorders in series between said terminals, and an emergency battery and a third emergency recorder between said emergency conductor and a point intermediate one of said rectifiers and one emergency recorder on the one side and the other rectifier and emergency recorder on the other side.

5. A signaling device comprising a signal loop, an emergency conductor for connection to points of said loop, signal transmitters in said loop for sending signals through said loop and through said conductor, a normal receiving station connected to the terminals of said loop and including a direct current source and a signal recorder, and an emergency receiving station connected between said conductor and a point of said first-mentioned station supplying substantially uniform potential and including an emergency recorder, at least one unidirectional conductor for separating direct current carrying circuits including said conductor and different ones of said recorders and a current regulator for automatically limiting to a predetermined value the current flowing in any circuit separated by said unidirectional conductor and including said emergency conductor.

6. A signaling system comprising a signal loop, an emergency conductor for connection to points of said loop, signal transmitters in said loop for sending signal impulses through said loop and through said conductor, a direct current source and a signal receiver connected in series to the terminals of said loop, two rectifier elements conducting current in different directions, respectively, and two emergency recorders in series between said terminals, and an automatic constant current regulator, an emergency battery and a third emergency recorder between said emergency conductor and a point intermediate one of said rectifiers and one emergency recorder on the one side and the other rectifier and emergency recorder on the other side, said current regulator limiting to a predetermined value the current flowing in any circuit separated by said rectifier elements and including said emergency conductor.

EDWARD J. McCARTHY.